Patented Jan. 6, 1925.

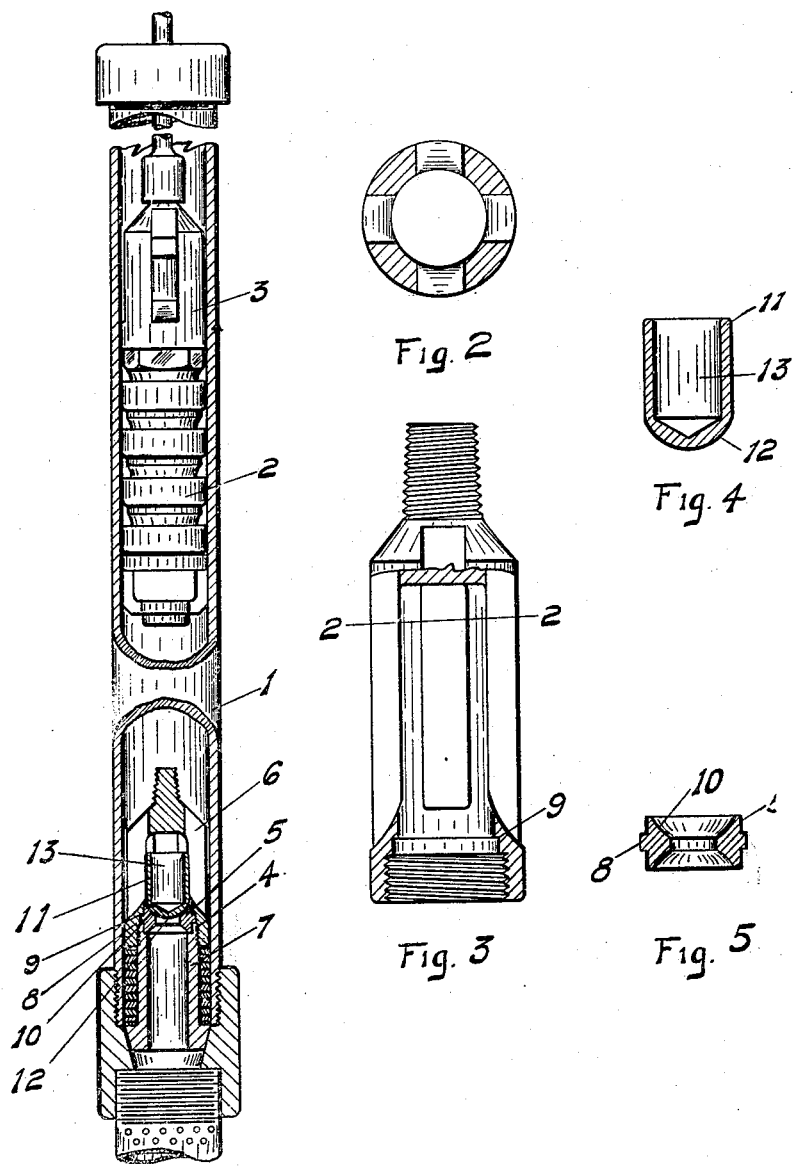

1,521,644

UNITED STATES PATENT OFFICE.

DANIEL E. NORRIS, OF ROBINSON, ILLINOIS.

VALVE.

Application filed July 23, 1921. Serial No. 486,982.

*To all whom it may concern:*

Be it known that I, DANIEL E. NORRIS, a citizen of the United States, residing at Robinson, county of Crawford, and State of Illinois, have invented new and useful Improvements in Valves, of which the following is a specification.

Pump valves for oil well pumps are subjected to very severe pressures and wear. The valves of such pumps are at present almost universally subjected to what is known as ball checks, the theory of these ball checks being that the ball in rotating and presenting new surfaces to the seat reduces the wear of the ball and consequently extends the life of the valve. The extension of the life of the valve is very important because the renewal of the valve parts can only be accomplished by pulling the pump which in a deep well involves considerable expense. I have found that the action of the liquids which are held in the pump between the pumping operations are such as to act upon the exposed surfaces of the valve so that as the valve is rotated and the surfaces acted upon reach the seat an imperfect closing action results. To obviate this difficulty I have formed a valve provided preferably with a spherical surface so elongated as to act with the crown of the valve to maintain the same seating surfaces in operation. In this way the surfaces which really affect the closure are not subjected to the direct action of the liquids standing in the pump. Where such elongation is made it is desirable that it be made hollow so as to keep its weight within permissible limits and it is also desirable that the valve surfaces be spherical so that with slight wear of the guiding surfaces of the crown there will be an opportunity to properly seat.

The invention is illustrated in the accompanying drawings as follows:—

Fig. 1 shows a vertical section of an oil well pump.

Fig. 2 a section on the line 2—2 in Fig. 3.

Fig. 3 a side elevation, partly in section, of the valve crown.

Fig. 4 a vertical section of the valve drop.

Fig. 5 a vertical section of the valve seat.

1 marks the working barrel, 2 the pump plunger, and 3 the plunger valve, this plunger valve having a structure similar in its general construction to that of the standing valve. The standing valve 4 is provided with a seat 5 and crown 6. The seat is locked in place by the packing follower 7 in the usual manner, the seat having an annular rib 8 acting on the annular shoulder 9 in the crown in the usual manner.

The seat has a spherical seating surface 10 and a valve drop 11 has a spherical end 12 corresponding to the surface 10. The drop 11 is elongated and cylindrical and forms a loose sliding fit with the crown so as to maintain the same seating surface on the end of the drop in operative relation to the seating surface on the seat. In this way the seating surface is not subjected to the action of the liquids retained in the pump through the pumping action. A longer seating surface may be secured by making the diameter of the sphere forming the seating surface greater than the diameter of the extension on the drop. In order that the drop may be as light as desirable it is made hollow. As shown the center is drilled out at 13. The elongated or cylindrical guiding surface acting on the crown guide reduces the wear on these crown guides and thus extends their life.

What I claim as new is:—

In a valve, the combination of a crown; a valve seat having a seating surface of spherical form; and a valve drop having a seating surface of spherical form corresponding to the seating surface on the seat, said drop having a cylindrical extension operating in connection with the crown to maintain the same seating surface of the drop in operative relation to the valve seating surface, the diameter of the sphere forming the seating surface of the drop being greater than the diameter of the cylindrical extension.

In testimony whereof I have hereunto set my hand.

DANIEL E. NORRIS.